United States Patent
Jung et al.

(10) Patent No.: US 8,088,849 B2
(45) Date of Patent: Jan. 3, 2012

(54) SCRATCH-RESISTANT POLYCARBONATE RESIN COMPOSITION

(75) Inventors: Hyuk Jin Jung, Uiwang-si (KR); Sang Hwa Lee, Uiwang-si (KR); Seung Shik Shin, Uiwang-si (KR); Jong Cheol Lim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/639,106

(22) Filed: Dec. 16, 2009

(65) Prior Publication Data

US 2010/0160511 A1 Jun. 24, 2010

(30) Foreign Application Priority Data

Dec. 24, 2008 (KR) .............................. 2008-133923

(51) Int. Cl.
*C08K 5/523* (2006.01)
(52) U.S. Cl. ..................... 524/127; 524/140; 524/141
(58) Field of Classification Search .................. 524/127, 524/140, 141
See application file for complete search history.

(56) References Cited

U.S. PATENT DOCUMENTS

| | | | |
|---|---|---|---|
| 4,027,073 A | 5/1977 | Clark | |
| 4,319,003 A | 3/1982 | Gardlund | |
| 4,455,205 A | 6/1984 | Olson et al. | |
| 4,906,696 A | 3/1990 | Fischer et al. | |
| 5,276,078 A | 1/1994 | Ogoe et al. | |
| 6,043,310 A * | 3/2000 | Liu et al. ..................... | 524/502 |
| 6,844,417 B1 | 1/2005 | Chisholm et al. | |
| 2008/0015291 A1 | 1/2008 | Siripurapu et al. | |
| 2008/0015292 A1 | 1/2008 | Lens et al. | |
| 2009/0326129 A1 | 12/2009 | Rogunova et al. | |

FOREIGN PATENT DOCUMENTS

| | | |
|---|---|---|
| EP | 0297285 A2 | 1/1989 |
| WO | 2010/005486 A2 | 1/2010 |

OTHER PUBLICATIONS

European Search Report in counterpart European Application No. 09180626, dated Feb. 1, 2010.

* cited by examiner

*Primary Examiner* — Peter Szekely
(74) *Attorney, Agent, or Firm* — Summa, Additon & Ashe, P.A.

(57) ABSTRACT

Disclosed herein is a scratch-resistant polycarbonate resin composition, the resin composition comprising: (A) about 100 parts by weight of a polycarbonate resin; (B) about 1 to about 30 parts by weight of a phosphate eater compound represented by the following Formula (II) or a combination thereof: and (C) about 0.1 to about 30 parts by weight of a halogen substituted polycarbonate oligomer represented by the following Formula (III):

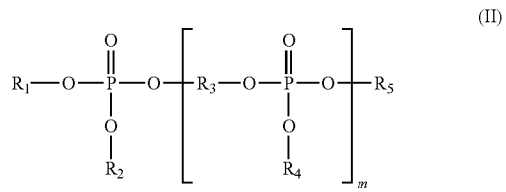

wherein $R_1$, $R_2$, $R_4$ and $R_5$ are each independently $C_{6-20}$ aryl or $C_{1-10}$ alkyl-substituted $C_{6-20}$ aryl, $R_3$ is $C_{6-30}$ aryl or $C_{1-10}$ alkyl-substituted $C_{6-30}$ aryl derivative, m represents a number average degree of polymerization, and the average of m is 0 to 3;

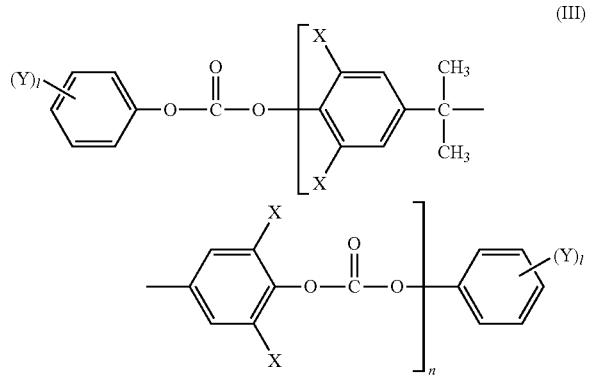

wherein each X is independently fluorine, chlorine or bromine, each Y is independently hydrogen, $C_{1-8}$ alkyl, fluorine, chlorine or bromine, n is an integer of 1 to 10, and 1 is an integer of 1 to 3. The polycarbonate resin composition can have good transparency and flame retardancy, as well as anti-scratch, flowability and processability.

14 Claims, No Drawings

SCRATCH-RESISTANT POLYCARBONATE RESIN COMPOSITION

CROSS REFERENCE TO RELATED APPLICATION

This application claims priority from Korean Patent Application No. 2008-133923 filed on Dec. 24, 2008 in the Korean Intellectual Property Office, the disclosure of which is incorporated herein by reference in its entirety.

FIELD OF THE INVENTION

The present invention relates to a scratch-resistant polycarbonate resin composition.

BACKGROUND OF THE INVENTION

Polycarbonate resins have been widely used as an engineering plastic material due to their high impact resistance, self-extinguishing properties, dimensional stability and high thermo-resistance, as compared to conventional polymers. Polycarbonate resins require flame retardancy and a good appearance when used in housings of electronic devices and office automation devices. However, polycarbonate resins do not have good external scratch resistance since they have a low pencil hardness of 2B or so. In order to improve the scratch resistance of polycarbonate resins, acrylic resins which have good scratch resistance can be mixed with a polycarbonate resin or coated on the surface of a polycarbonate article.

U.S. Pat. No. 4,319,003 and EP 297285 disclose an opaque blend of a mixture of polycarbonate and polymethylmethacrylate (PMMA). However, the composition reduces transparency and experiences a significant drop in heat-resistance.

U.S. Pat. Nos. 4,027,073 and 4,455,205 disclose a method of coating a silicone based resin and acrylic based resin having good scratch resistance on the surface of a polycarbonate article. However, the method requires an extra coating step and equipment, which raises the cost.

In addition, U.S. Published Application Nos. 2008/0015292 and 2008/0015291 disclose a composition comprising polycarbonate copolymer and bisphenol A polycarbonate derived from dimethyl bisphenol cyclohexane, which can have good scratch resistance. However, the product cost can be high and the impact strength can be significantly reduced.

SUMMARY OF THE INVENTION

An aspect of the present invention provides a scratch-resistant polycarbonate resin composition comprising (A) about 100 parts by weight of a polycarbonate resin; (B) about 1 to about 30 parts by weight of a phosphate eater compound or a mixture or combination thereof: and (C) about 0.1 to about 30 parts by weight of a halogen substituted polycarbonate oligomer. The polycarbonate resin composition of the invention can have good transparency, flame retardancy, flowability, processability, as well as anti-scratch properties.

Another aspect of the present invention provides a scratch-resistant polycarbonate resin composition further comprising at least one additive selected from the group consisting of flame retardant aids, UV stabilizers, fluorescent whitening agents, lubricants, releasing agents, nucleating agents, antistatic agents, antioxidants, heat stabilizers, reinforcing agents, inorganic fillers, pigments and dyes, and the like, and combinations thereof.

Another aspect of the present invention provides a scratch-resistant polycarbonate resin composition that can have a pencil hardness of F to 2H measured in accordance with JIS K-5401, a flame retardancy of V-0 measured in accordance with UL-94 at a sample thickness of 2.0 mm, a light transmittance of about 80% or more measured in accordance with ASTM D1003 at a sample thickness of 2.5 mm, a haze of about 1.5% or less, and a melt flow index of about 30 to about 100 g/10 min measured in accordance with ASTM D1238 at 250° C., under a 10 kg load.

Another aspect of the present invention provides molded articles produced from the resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin

The polycarbonate resin can be prepared by reacting one or more diphenols represented by the following Formula (I) with a phosgene, a halogen formate or a carboxylic acid diester:

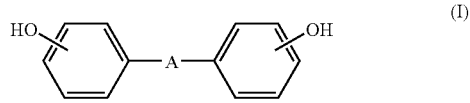

wherein A is a single bond, $C_1$-$C_5$ alkylene, $C_1$-$C_5$ alkylidene, $C_5$-$C_6$ cycloalkylidene, S or $SO_2$.

Examples of diphenols suitable for use in the present invention can include without limitation 4,4'-dihydroxydiphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane ('bisphenol A'), 2,2-bis-(3,5-dichloro-4-hydroxyphenyl)-propane, and the like, and combinations thereof. Further, the dihydric phenols may include compounds such as hydroquinone, resorcinol, and the like, and combinations thereof. In exemplary embodiments, the bisphenol can include 2,2-bis(4-hydroxyphenyl)propane, 2,2-bis-(3,5-dichloro-4-hydroxyphenyl)-propane, 1,1-bis-(4-hydroxyphenyl)-cyclohexane, or a combination, and in another exemplary embodiment, the dihydric phenol may include 2,2-bis(4-hydroxyphenyl)propane (which is also referred to as 'bisphenol A').

In the present invention, the polycarbonate resin (A) can have a weight average molecular weight (Mw) of about 10,000 to about 200,000, for example about 15,000 to about 80,000.

Suitable polycarbonates incorporated into the composition of the present invention, without limitation, may be linear or branched, and may also be a combination thereof.

For example, a branched polycarbonate may be produced by incorporation of about 0.05 to about 2 mol %, based on the total quantity of diphenols used in a polymerization process, of tri- or higher functional compounds, for example, those with three or more phenolic groups.

The polycarbonate resin (A) may also be a combination of polycarbonates having two (2) or more different molecular weights. In addition, a homopolymer of polycarbonate, a copolymer of polycarbonate or a combination thereof may be used in this invention. Non-limiting examples of copolymers of polycarbonate that may be used include aromatic polyester-carbonate resin prepared by polymerization in the presence of an ester precursor, such as a difunctional carboxylic acid, or polyorganosiloxane-carbonate copolymer resin.

(B) Phosphate Ester Compound

In exemplary embodiments, the resin composition includes a phosphate ester compound represented by the following Formula (II) or a combination thereof:

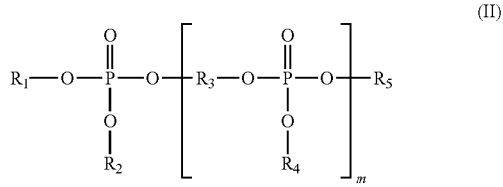

wherein:

$R_1$, $R_2$, $R_4$ and $R_5$ are each independently $C_{6-20}$ aryl or $C_{1-10}$ alkyl-substituted $C_{6-20}$ aryl;

$R_3$ is a $C_{6-30}$ aryl or $C_{1-10}$ alkyl-substituted $C_{6-30}$ aryl derivative; and m represents the number average degree of polymerization, and the average of m is 0 to 3.

In exemplary embodiments, $R_1$, $R_2$, $R_4$ and $R_5$ each independently may be phenyl. In exemplary embodiments, $R_1$, $R_2$, $R_4$ and $R_5$ each independently may be phenyl substituted with alkyl such as methyl, ethyl, isopropyl, t-butyl, isobutyl, isoamyl, t-amyl or the like. In exemplary embodiments, $R_1$, $R_2$, $R_4$ and $R_5$ each independently may be phenyl or phenyl substituted with methyl, ethyl, isopropyl, or t-butyl.

In exemplary embodiments, $R_3$ can be derived from compounds such as hydroquinone, resorcinol, bisphenol A, and the like.

In exemplary embodiments, m of Formula (II) above may be an integer of 0, 1, 2, or 3. In exemplary embodiments, more than one compound represented by Formula (II) above may be the phosphate ester of the resin composition. Thus, some embodiments include combinations or mixtures of the phosphate ester compounds as represented by the Formula (II) above, which can also have varying m values In certain embodiments, i) when m is 0, exemplary phosphate ester compound(s) can include without limitation triphenylphosphate, tricresylphosphate, cresylphenylphosphate, trixyrylphosphate, tri(2,4,6-trimethylphenyl)phosphate, tri (2,4,6-ditertiarybutylphenyl)phosphate, tri(2,6-ditertiarybutyl)phosphate, and the like, and combinations thereof.

In other certain embodiments, ii) when m is 1, exemplary phosphate ester compound(s) can include without limitation resorcinol-bis(diphenylphosphate), hydroquinol-bis(diphenylphosphate), bisphenol A-bis(diphenylphosphate), resorcinol-bis(2,6-ditertiarybutylphenylphosphate), hydroquinol-bis(2,6-dimethylphenylphosphate), and the like, and combinations thereof.

In other certain embodiments, iii) when m is 2 or more, exemplary phosphate ester compound(s) can include without limitation a combination or mixture of oligomeric phosphate ester compounds.

One or more compounds mentioned above can be used. For example, the phosphate ester can be a compound wherein m is 1, 2 or 3, which phosphate ester can be mixed with a phosphate ester in which m is 0.

In exemplary embodiments, the phosphate ester compounds (B) can be oligomeric phosphate ester compounds in which the average of m is 0 to 3.

The phosphate ester compound (B) can be produced as a combination or mixture of compounds having different m values by reacting various corresponding constituents, or it can be a combination or mixture of phosphate esters with different m values, each of which can be prepared separately in advance.

In certain embodiments, the polycarbonate resin composition can include the phosphate ester compound(s) (B) in an amount of about 1 to about 30 parts by weight, for example about 5 to about 25 parts by weight, as another example about 7 to about 20 parts by weight, based on about 100 parts of the polycarbonate resin (A). If the polycarbonate resin composition comprises less than about 1 part by weight of the phosphate ester compound(s) (B), it may be difficult to acquire proper fire resistance. If the polycarbonate resin composition comprises more than about 30 parts by weight of the phosphate ester compound(s) (B), the balance of properties such as transparency and scratch resistance may be reduced.

(C) Halogen Substituted Polycarbonate Oligomer

In some embodiments, the polycarbonate resin composition can include one or more halogen substituted polycarbonate oligomers represented by the following Formula (III):

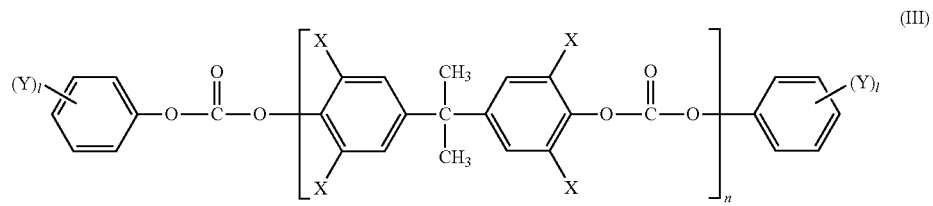

wherein:

each X is independently fluorine, chlorine or bromine, each Y is independently hydrogen, $C_{1-8}$ alkyl, fluorine, chlorine or bromine, n is an integer of 1 to 10, and l is an integer of 1 to 3.

Each X can be independently chlorine or bromine, for example, bromine. Each Y can be independently methyl, ethyl, propyl, butyl, chlorine or bromine, for example, bromine. n can be an integer of 1 to 7 and l can be an integer of 1 to 3.

An example of the halogen substituted polycarbonate oligomer (C) represented by the above Formula (III) is a polycarbonate oligomer derived from tetrabromo bisphenol-A wherein n is an integer of 3 to 6.

In certain embodiments, the polycarbonate resin composition can include the halogen substituted polycarbonate oligomer(s) (C) in an amount of about 0.1 to about 30 parts by weight, for example about 1 to about 20 parts by weight, and as another example about 3 to about 15 parts by weight, based on about 100 parts by weight of the polycarbonate resin. If the polycarbonate resin composition comprises less than about 0.1 part by weight of the halogen substituted polycarbonate oligomer (C), it may be difficult to acquire improved fire resistance. If the resin composition comprises more than about 30 parts by weight of the halogen substituted polycarbonate oligomer (C), the balance of properties such as transparency and flowability may be reduced.

The polycarbonate resin composition of the present invention may further include one or more conventional additives such as but not limited to flame retardant aids, UV stabilizers, fluorescent whitening agents, lubricants, releasing agents, nucleating agents, antistatic agents, antioxidants, heat stabilizers, reinforcing agents, inorganic fillers, pigments, dyes, and the like, and combinations thereof. The additives may be used singly, or a combination of at least two or more thereof. The inorganic additive may be present in the composition of the invention in an amount of about 0.1 to about 60 parts by weight, for example about 1 to about 40 parts by weight, based on about 100 parts by weight of components (A)+(B)+(C) of the resin composition.

The resin composition of the present invention may be prepared by conventional methods. For example, the aforementioned components and optionally one or more additives may be mixed together in a mixer, the mixture may be melt-extruded through a conventional extruder into pellet form, and then the resin pellets may be used to prepare plastic molded articles by any suitable molding technique, such as injection and extrusion molding.

In exemplary embodiments, the polycarbonate resin composition can have a pencil hardness of F to 2H measured in accordance with JIS K-5401, a flame retardancy of V-0 measured in accordance with UL-94 at a sample thickness of 2.0 mm, a light transmittance of about 80% or more measured in accordance with ASTM D1003 at a sample thickness of 2.5 mm, a haze of about 1.5% or less, and a melt flow index of about 30 to about 100 g/10 min measured in accordance with ASTM D1238 at 250° C., under 10 kg load. The polycarbonate resin composition can have a high value of light transmittance and low haze, and thus the upper limit of light transmittance and lower limit of haze are not limited.

The polycarbonate resin composition according to the present invention can have good transparency and flame retardancy, as well as anti-scratch, flowability and processability properties, and thus it can be used to mold of a variety of products, such as but not limited to housings of electric/electronic goods or interior/exterior materials for automobiles.

In exemplary embodiments, the polycarbonate resin composition may be molded into housings of electric/electronic goods such as TVs, audio sets, mobile phones, digital cameras, navigation devices, washing machines, computers, monitors, MP3 players, DVD players, video players, CD players, dish washers, office automation equipment, and the like.

Further, the polycarbonate resin composition may be molded to provide interior/exterior materials for automobiles such as dash boards, instrument panels, quarter panels, door panels, wheel covers, and the like.

The molding methods may be, but are not limited to, extrusion, injection, or casting molding, and may be easily carried out by those skilled in the art.

The invention may be better understood by reference to the following examples which are intended for the purpose of illustration and are not to be construed as in any way limiting the scope of the present invention, which is defined in the claims appended hereto.

EXAMPLES

The compound specifications of (A) the polycarbonate resin, (B) the phosphate ester compound, and (C) the halogen substituted polycarbonate oligomer used in the Examples and Comparative Examples will be described more fully hereinafter.

(A) Polycarbonate Resin

Bisphenol-A polycarbonate with a weight average molecular weight of 25,000 g/mol manufactured by Teijin Chemicals Ltd. of Japan (product name: PANLITE L-1250 W) is used.

(B) Phosphate Ester Compound ($B_1$) A phosphate ester compound derived from bisphenol-A, which is represented by the Formula (II) above and comprises 3.4 wt % of phosphate ester compounds wherein m=0, 85.4 wt % of phosphate ester compounds wherein m=1 and 11.2 wt % of phosphate ester compounds wherein m=2 or more, wherein the average m value is 1.08 and $R_1$, $R_2$, $R_4$ and $R_5$ each are phenyl, manufactured by Daihachi Co., Ltd. of Japan (product name: CR-741) is used.

($B_2$) A phosphate ester compound derived from resorcinol, manufactured by Daihachi Co., Ltd. of Japan (product name: PX-200) is used.

(C) Halogen Substituted Polycarbonate Oligomer

Tetrabromobisphenol-A polycarbonate oligomer which is represented by the Formula (III) above wherein Y is bromine, l is 3 and n is 3 to 6, manufactured by Great Lakes, Ltd. of the USA (product name: BC-58) is used.

(C') Poly(meth)acrylate Alkyl Ester Resin

Polymethylmethacrylate resin manufactured by LG MMA Ltd. of South Korea (product name: IF-850) is used.

Examples 1 to 6 and Comparative Examples 1 to 5

The components as shown in Table 1 and 0.2 parts by weight of an antioxidant, Irganox 1076 manufactured by Ciba, Ltd. of Switzerland and 0.1 by weight of a heat stabilizer Irgafos 168 manufactured by Ciba, Ltd. are added to a conventional mixer, and the mixture is extruded through a conventional twin screw extruder (L/D=35, φ=45 mm) to prepare a product in pellet form. The resin pellets are molded into test specimens for measuring scratch resistance, flame retardancy and light transmittance using a 10 oz injection molding machine at 250 to 280° C. The test specimens are dried at 23° C., 50% relative humidity for 48 hours. Then, various physical properties of the test specimens as follows are measured in accordance with JIS and ASTM standards described below, and the results are shown in Table 1 below.

(1) Pencil hardness: the pencil hardness is measured in accordance with JIS K-5401 using plate test specimen with dimensions of L 100 mm×W 100 mm.

(2) Flame Retardancy: the flame retardancy is measured in accordance with UL 94V using a 2.0 mm thick test specimen.

(3) Light transmittance and Haze: the light transmittance and the haze are measured in accordance with ASTM D1003 using a 2.5 mm thick test specimen.

(4) Melt index: the melt index is measured in accordance with ASTM D1238 at 250° C. under 10 kgf load.

TABLE 1

| | | Examples | | | | | | Comparative Examples | | | | |
|---|---|---|---|---|---|---|---|---|---|---|---|---|
| | | 1 | 2 | 3 | 4 | 5 | 6 | 1 | 2 | 3 | 4 | 5 |
| (A) | | 100 | 100 | 100 | 100 | 100 | 100 | 100 | 100 | 100 | 100 | 100 |
| (B) | (B1) | 10 | 15 | — | 5 | 20 | 5 | 15 | — | 10 | 15 | — |
| | (B2) | — | — | 10 | 5 | — | — | — | — | — | — | — |
| (C) | | 5 | 10 | 5 | 5 | 5 | 20 | — | 15- | — | — | — |
| (C') | | — | — | — | — | — | — | — | — | 5 | 10 | — |
| Pencil hardness | | F | F | F | F | F | F | B | B | HB | F | 2B |
| Flame retardancy (2.0 mm) | | V-0 | V-0 | V-0 | V-0 | V-0 | V-0 | V-2 | V-1 | Fail | Fail | V-2 |
| Light transmittance (2.5 mm)(%) | | 88.7 | 88.5 | 88.4 | 88.5 | 88.4 | 88.5 | 88.6 | 88.1 | 50.2 | 32.8 | 89.1 |
| Haze (2.5 mm)(%) | | 0.3 | 0.4 | 0.5 | 0.4 | 0.5 | 0.4 | 0.4 | 0.4 | 60.4 | 78.2 | 0.3 |
| Melt index (g/10 min) | | 42 | 71 | 40 | 69 | 97 | 31 | 40 | 16 | 53 | 83 | 13 |

As shown in Table 1, Examples 1 to 6 exhibit improved light transmittance and flame retardancy, as well as good scratch resistance and flowability. Compared to this, Comparative Example 1, which does not include the halogen substituted polycarbonate oligomer (C), exhibits highly reduced scratch resistance and flame retardancy although there is little difference in light transmittance and flowability. Further, all of the properties except light transmittance are reduced in Comparative Example 2, which does not include the phosphate ester compound (B).

When poly(meth)acrylate ester copolymer (C') is used instead of the halogen substituted polycarbonate oligomer as in Comparative Examples 3 and 4, the pencil hardness is reduced and flame retardancy and light transmittance are significantly reduced.

When the phosphate ester compound (B) and the halogen substituted polycarbonate oligomer (C) both are not used, light transmittance is maintained but scratch resistance, flame retardancy and flowability is significantly reduced, as reported for Comparative Examples 1 and 2

The polycarbonate resin composition of the present invention accordingly can have good light transmittance, flame retardancy, scratch resistance, flowability and processability, may be molded into plastic molded articles having improved physical properties as compared to conventional products, and may be used for various electrical and electronic appliances, parts of automobiles, and the like.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A scratch-resistant polycarbonate resin composition, the resin composition consisting essentially of:

(A) about 100 parts by weight of a polycarbonate resin;

(B) about 1 to about 30 parts by weight of a phosphate ester compound represented by the following Formula (II) or a combination thereof

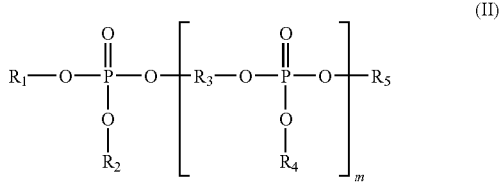

wherein:

$R_1$, $R_2$, $R_4$ and $R_5$ are each independently $C_{6-20}$ aryl or $C_{1-10}$ alkyl-substituted $C_{6-20}$ aryl, $R_3$ is $C_{6-30}$ aryl or $C_{1-10}$ alkyl-substituted $C_{6-30}$ aryl derivative, and m represents a number average degree of polymerization, and the average of m is 0 to 3; and (C) about 0.1 to about 30 parts by weight of a halogen substituted polycarbonate oligomer represented by the following Formula (III):

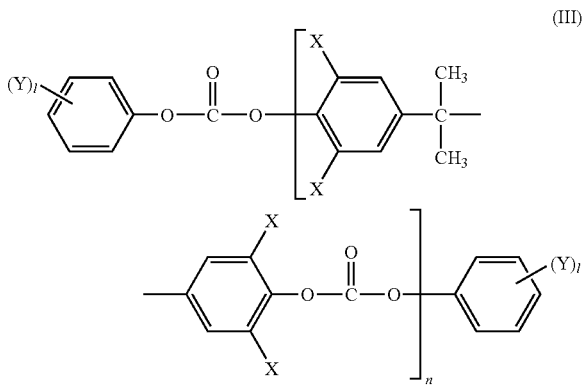

wherein:

each X is independently fluorine, chlorine or bromine, each Y is independently hydrogen, $C_{1-8}$ alkyl, fluorine, chlorine or bromine, n is an integer of 1 to 10, and l is an integer of 1 to 3.

2. The polycarbonate resin composition of claim 1, wherein $R_1$, $R_2$, $R_4$ and $R_5$ of Formula (II) are each independently phenyl or phenyl substituted with methyl, ethyl, isopropyl, or t-butyl and $R_3$ is a derivative of hydroquinone, resorcinol or bisphenol A.

3. The polycarbonate resin composition of claim 1, wherein said halogen substituted polycarbonate oligomer of Formula (III) is a tetrabromo bisphenol A derivative wherein n is 3 to 6.

4. The polycarbonate resin composition of claim 1, wherein said resin composition further comprises at least one additive selected from the group consisting of flame retardant aids, UV stabilizers, fluorescent whitening agents, lubricants, releasing agents, nucleating agents, antistatic agents, antioxidants, heat stabilizers, reinforcing agents, inorganic fillers, pigments, dyes, and combinations thereof.

5. The polycarbonate resin composition of claim 1, wherein resin composition has a pencil hardness of F to 2H measured in accordance with JIS K-5401 and a light transmittance of about 80% or more measured in accordance with ASTM D1003 at a sample thickness of 2.5 mm.

6. The polycarbonate resin composition of claim 1, wherein resin composition has a pencil hardness of F to 2H measured in accordance with JIS K-5401, a flame retardancy of V-0 measured in accordance with UL-94 at a sample thickness of 2.0 mm and a light transmittance of about 80% or more measured in accordance with ASTM D1003 at a sample thickness of 2.5 mm.

7. The polycarbonate resin composition of claim 1, wherein resin composition has a pencil hardness of F to 2H measured in accordance with JIS K-5401, a flame retardancy of V-0 measured in accordance with UL-94 at a sample thickness of 2.0 mm, a light transmittance of about 80% or more measured in accordance with ASTM D1003 at a sample thickness of 2.5 mm and a melt flow index of about 30 to about 100 g/10 min measured in accordance with ASTM D1238 at 250° C., under 10 kg load.

8. The polycarbonate resin composition of claim 1, wherein resin composition has a pencil hardness of F to 2H measured in accordance with JIS K-5401, a flame retardancy of V-0 measured in accordance with UL-94 at a sample thickness of 2.0 mm, a light transmittance of about 80% or more measured in accordance with ASTM D1003 at a sample thickness of 2.5 mm, a haze of about 1.5% or less, and a melt flow index of about 30 to about 100 g/10 min measured in accordance with ASTM D1238 at 250° C., under 10 kg load.

9. A molded article produced from the resin composition as defined in claim 1.

10. The polycarbonate resin composition of claim 2, wherein the average of m is 1 to 3, $R_1$, $R_2$, $R_4$ and $R_5$ of Formula (II) are each independently phenyl or phenyl substituted with methyl, ethyl, isopropyl, or t-butyl and $R_3$ is a derivative of hydroquinone, resorcinol or bisphenol A.

11. The polycarbonate resin composition of claim 10, wherein $R_3$ is a derivative of hydroquinone or resorcinol.

12. A scratch-resistant polycarbonate resin composition, the resin composition consisting of:

(A) about 100 parts by weight of a polycarbonate resin;

(B) about 1 to about 30 parts by weight of a phosphate ester compound represented by the following Formula (II) or a combination thereof

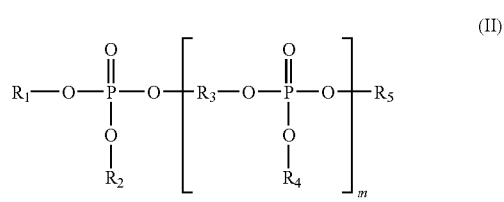

wherein:

$R_1$, $R_2$, $R_4$ and $R_5$ are each independently $C_{6-20}$ aryl or $C_{1-10}$ alkyl-substituted $C_{6-20}$ aryl, $R_3$ is $C_{6-30}$ aryl or $C_{1-10}$ alkyl-substituted $C_{6-30}$ aryl derivative, and m represents a number average degree of polymerization, and the average of m is 0 to 3;

(C) about 0.1 to about 30 parts by weight of a halogen substituted polycarbonate oligomer represented by the following Formula (III):

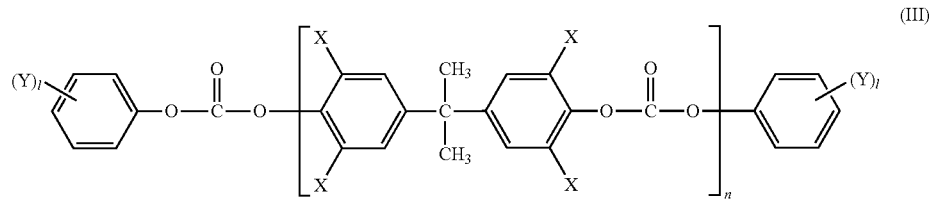

wherein:
each X is independently fluorine, chlorine or bromine,
each Y is independently hydrogen, $C_{1-8}$ alkyl, fluorine, chlorine or bromine,
n is an integer of 1 to 10, and
l is an integer of 1 to 3; and
optionally a UV stabilizer, fluorescent whitening agent, lubricant, releasing agent, nucleating agent, antistatic agent, antioxidant, reinforcing agent, inorganic filler, pigment, dye, or a combination thereof.

13. The polycarbonate resin composition of claim 12, wherein the average of m is 1 to 3, $R_1$, $R_2$, $R_4$ and $R_5$ of Formula (II) are each independently phenyl or phenyl substituted with methyl, ethyl, isopropyl, or t-butyl and $R_3$ is a derivative of hydroquinone, resorcinol or bisphenol A.

14. The polycarbonate resin composition of claim 13, wherein $R_3$ is a derivative of hydroquinone or resorcinol.

* * * * *